United States Patent [19]

Johannes

[11] Patent Number: 4,809,255

[45] Date of Patent: Feb. 28, 1989

[54] DEVICE FOR SECURING COMPACT DISKS ON UPRIGHT PLAYERS

[75] Inventor: Caspers Johannes, Villingen-Schwenningen, Fed. Rep. of Germany

[73] Assignee: Deutsche Thomson-Brandt GmbH, Villingen-Schwenningen, Fed. Rep. of Germany

[21] Appl. No.: 26,849

[22] PCT Filed: Jun. 28, 1986

[86] PCT No.: PCT/EP86/00383

§ 371 Date: Mar. 2, 1987

§ 102(e) Date: Mar. 2, 1987

[87] PCT Pub. No.: WO87/00673

PCT Pub. Date: Jan. 29, 1987

[30] Foreign Application Priority Data

Jul. 24, 1985 [DE] Fed. Rep. of Germany ....... 3526370

[51] Int. Cl.$^4$ ............................................. G11B 25/04
[52] U.S. Cl. ................................... 369/270; 369/75.2

[58] Field of Search .................. 369/270, 271, 75.2; 346/137

[56] References Cited

U.S. PATENT DOCUMENTS 4,562,566 12/1985 Eisemann ...................... 369/75.2

FOREIGN PATENT DOCUMENTS 56-3473 1/1981 Japan .

Primary Examiner—Stuart S. Levy
Assistant Examiner—Steven M. duBois
Attorney, Agent, or Firm—Max Fogiel

[57] ABSTRACT

With vertical playback decks there is a risk that, when the pressure arm is released in the stop mode, the expensive and fragile compact disc may fall out. This risk is overcome by designing the centering piece with a groove arranged in front of the centering diameter and by the provision, at the front end of the centering piece and at the rear wall of the groove, of a bevel edge of about 45° and, at the front wall of the groove, of a bevel edge of between 5° and 10°.

7 Claims, 1 Drawing Sheet

DEVICE FOR SECURING COMPACT DISKS ON UPRIGHT PLAYERS

BACKGROUND OF THE INVENTION

The invention concerns a device for securing a compact disk to an upright player, with a means of mounting the disk and a means of preventing it from dropping out.

Upright compact-disk players are generally inexpensive embodiments without costly disk accommodations or compartments. The disks are forced against a turntable and accordingly centered by means of a pressure-application lever in this simple and economical design. When the user disengages the aforesaid mechanism in order to remove the disk, it can readily slide off center and drop out unless carefully handled. One reason for this is that the disk does not stop instantaneously subject to a stop pulse when the lever is disengaged. A falling compact disk can not only be damaged but can cause injuries.

To reliably secure the compact disk to the turntable, the pressure-application mechanism is usually provided with a permanent magnet that functions in conjunction with a soft-iron turntable.

SUMMARY OF THE INVENTION

The object of the invention is accordingly to design a device for securing the damage-sensitive compact disks to upright players and to prevent them from dropping out and falling while being loaded or replaced.

In accordance with the present invention, the forward edge of the centering component is beveled in accordance with the invention and provided with a groove in front of the rear centering diameter. The forward wall of the groove is steeply slanted, its rear wall shallowly slanted, and its base somewhat wider than the thickest available compact disk. This provides a practical means of easily and reliably inserting the disk and allows the pressure-application lever as it engages to employ its pressure-application mechanism to force the disk over the bevel and into the centering position with no risk of damage. When the lever is disengaged, the disk slides into the groove, whence it can be safely removed. The front of the improved centering component with its safety groove simultaneously functions as a means of centering the pressure-application lever or mechanism and can be designed to prevent damage to the disk.

One embodiment of the invention will now be described with reference to the drawing.

DESCRIPTION OF THE PREFERRED EMBODIMENTS

Figure 1:
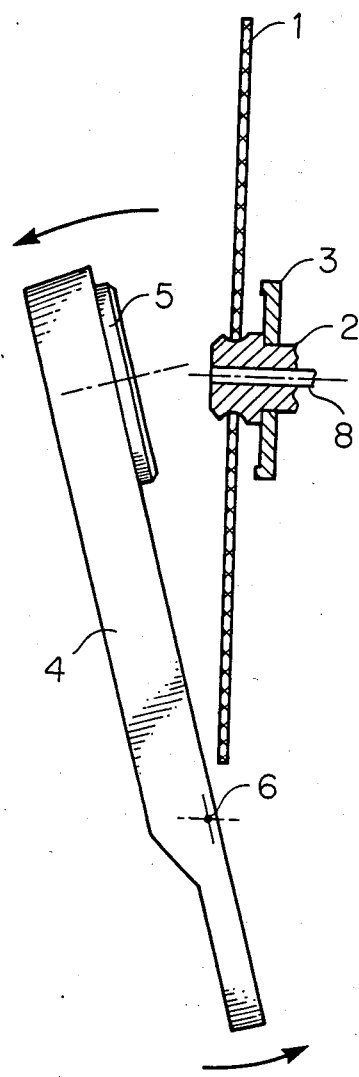
FIG. 1 is a side view of the disengaged pressure-application lever along with a sectional side view of the compact disk, centering component, and turntable.
Figure 2:
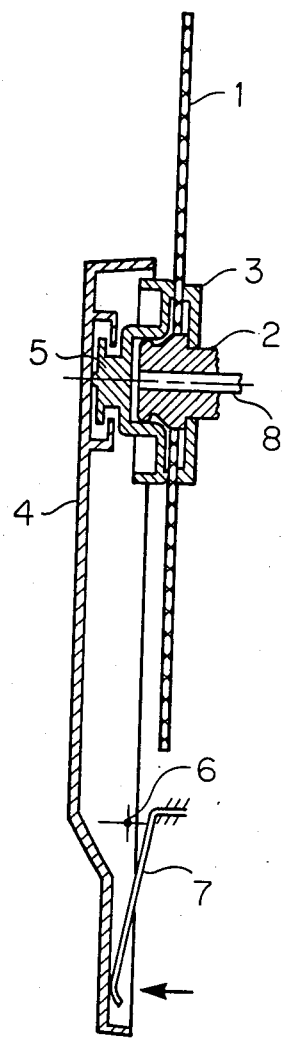
FIG. 2 is a sectional side view of the engaged pressure-application lever with the pressure-application mechanism in the playing position.

The illustration by way of example in FIGS. 1 and 2 of a device for securing a compact disk is intentionally simplified and reduced to the components essential to the invention. FIG. 1 illustrates a pressure-application lever 4, which rotates around a point 6, in the stop-mode position. A compact disk 1 is suspended in a groove in a centering component 2. The disk rests on component 2, which is mounted on a shaft 8. The groove functions as a means of mounting a freshly inserted disk as well as a means of preventing it from falling while it is being changed. The base of the groove is wide enough, approximately 1.5 mm, to loosely accommodate the disk, which is about 1.2 mm thick. When the play mode is activated, a spring 7 pivots pressure-application lever 4 (as will be evident from FIG. 2) along with a pressure-application mechanism 5, which is inserted inside it in such a way that it can move therein, around a point 6 of rotation, forcing compact disk 1 out of the groove over its slanting rear wall and into the desired centered position on centering component 2. Pressure-application mechanism 5 consists of a permanent magnet. It operates in conjunction with a turntable 3 that is made out of a weakly magnetic material, reliably securing the disk. It turns out to be practical for the forward edge of centering component 2 to bevel approximately 45° so that pressure-application mechanism 5 can readily slip over it. Since the rear wall of the groove is also slanted, disk 1 can slide into the centered position easier. Since the forward wall of the groove slants approximately 5°–10°, disk 1 will remain reliably in the groove when pressure-application lever 4 is disengaged and pressure-application mechanism 5 releases the disk.

When a stop pulse is emitted and pressure-application lever 4 is shifted manually into the position illustrated in FIG. 1, disk 1 is released and can only slide into the illustrated position, within the groove. It is accordingly prevented from falling out, and the user can easily remove it.

I claim:

1. An arrangement for securing a compact disk in an upright player, comprising: means for mounting said disk; means for preventing said disk from dropping out of its mounting place and having a pressure application lever and pressure application means; a turntable operating in conjunction with said pressure application lever and said pressure application means; a centering component on said turntable and having a beveled forward edge surrounded by a groove in front of said centering component; said groove having two walls slanting at different angles for holding said compact disk securely in said groove, said pressure application lever actuating said pressure application means for forcing said disk over the bevel of said forward edge and into a centering position free of damage to said disk.

2. An arrangement as defined in claim 1, wherein said bevel on said forward edge of said centering component and the inner slope of the wall of the groove in front of said centering component slant substantially 45°, the forward wall of said groove deviating from the vertical by an angle substantially from 5° to 10°.

3. An arrangement as defined in claim 1, wherein said groove has a base that is at least 1.5 mm wide.

4. An arrangement for securing a compact disk in an upright player, comprising: means for mounting said disk; means for preventing said disk from dropping out of its mounting place and having a pressure application lever and pressure application means; a turntable operating in conjunction with said pressure application lever and said pressure application means; a centering component on said turntable and having a beveled forward edge surrounded by a groove in front of said centering component; said groove having two walls slanting at different angles for holding said compact disk securely in said groove, said pressure application lever actuating said pressure application means for forcing said disk over the bevel of said forward edge and into a centering position free of damage to said disk; said bevel on said forward edge of said centering component and the inner slope of the wall of said groove in front of said centering component slanting substantially 45°, the forward wall of said groove deviating from the vertical by an angle substantially from 5° to 10°, said groove having a base that is at least 1.5 mm wide.

5. An arrangement for securing a compact disk in an upright player, comprising: means for mounting said disk; means for preventing said disk from dropping out of its mounting place and having a pressure application lever and pressure application means; a turntable operating in conjunction with said pressure application lever and said pressure application means; a centering component said turntable and having a beveled forward edge surrounded by a groove in front of said centering component; said groove having two walls slanting at different angles for holding said compact disk securely in said groove, said pressure application lever actuating said pressure application means for forcing said disk over the bevel of said forward edge and into a centering position free of damage to said disk; one of said walls being a forward wall with a relatively steep slant, the other one of said walls being a rear wall with a relatively shallow slant, said groove having a base substantially wider than the thickest available compact disk, said disk sliding into said groove when said lever is disengaged, the front of said centering component centering said pressure-application lever and preventing damage to said disk.

6. An arrangement as defined in claim 5, wherein the bevel on said forward edge of said centering component and the inner slope of the wall of said groove in front of said centering component slant substantially 45°, the forward wall of said groove deviating from the vertical by substantially an angle from 5° to 10°.

7. An arrangement as defined in claim 5, wherein said groove has a base that is at least 1.5 mm wide.

* * * * *